(12) United States Patent
Van De Bruinhorst

(10) Patent No.: US 6,272,718 B1
(45) Date of Patent: Aug. 14, 2001

(54) WIPER ARM

(75) Inventor: Ben Van De Bruinhorst, Zepperen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,933

(22) PCT Filed: Jun. 8, 1999

(86) PCT No.: PCT/DE99/01676

§ 371 Date: Feb. 2, 2000

§ 102(e) Date: Feb. 2, 2000

(87) PCT Pub. No.: WO99/64277

PCT Pub. Date: Dec. 16, 1999

(30) Foreign Application Priority Data

Jun. 8, 1999 (DE) ............................. 198 25 529

(51) Int. Cl.⁷ ................. B60S 1/32; B60S 1/34
(52) U.S. Cl. .................. 15/250.351; 15/250.352; 403/314; 403/409.1
(58) Field of Search ............ 15/250.351, 250.352, 15/250.21, 250.31, 250.34, 250.23; 403/24, 375, 409.1, 314

(56) References Cited

U.S. PATENT DOCUMENTS 4,559,663 * 12/1985 Bauer et al. ............. 15/250.351

FOREIGN PATENT DOCUMENTS

| 1985505 | * | 5/1968 | (DE) . | |
| 566471 | * | 10/1993 | (EP) | 15/250.351 |
| 785116 | * | 1/1997 | (EP) . | |
| 2401803 | * | 3/1979 | (FR) . | |
| 2443948 | * | 7/1980 | (FR) . | |
| 2069325 | * | 8/1981 | (GB) | 15/250.352 |

* cited by examiner

*Primary Examiner*—Gary K. Graham
(74) *Attorney, Agent, or Firm*—Michael J. Striker

(57) ABSTRACT

A wiper arm, has a joint part (1) and a wiper rod (2), in which the wiper rod (2) is guided in the joint part (1) in a guide region (1.2) by means of spaced-apart retaining faces (3, 4), and the retaining faces (3, 4) in the installed state fit over at least a fractional portion (7.2) of the wiper rod (2), in which the retaining faces (3, 4) taper conically toward one another, in which the wiper rod (2) has a conically tapering partial region (7), and in which the outer dimensions of the partial region (7), in a first portion, are less than the inside diameter between the retaining faces (3, 4) and, in a second portion (7.2), a distance between edges of the retaining faces (3, 4) is larger than a distance between the first portion (7.1) and the retaining faces (3, 4).

5 Claims, 1 Drawing Sheet

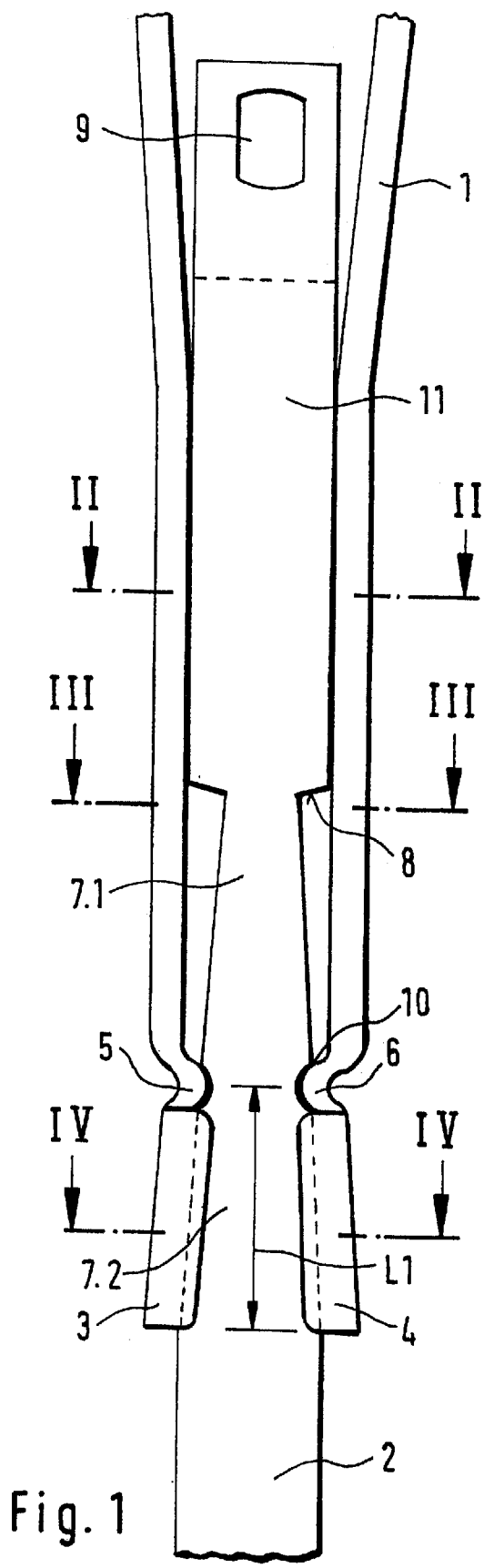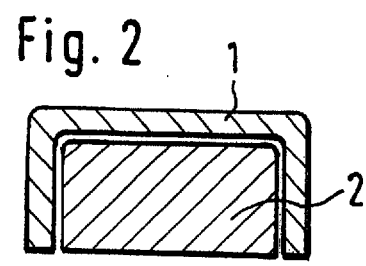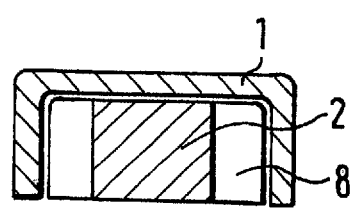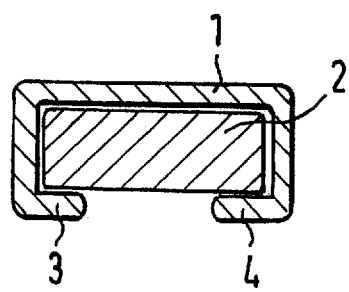

WIPER ARM

BACKGROUND OF THE INVENTION

The present invention relates generally to wiper arms.

A wiper arm substantially comprises a wiper rod and a joint part and serves to connect a wiper blade with a drive mechanism.

For connecting the wiper rod to the joint part, it is known to use single or double rivet connections, or a rivetless connection by positive engagement as a consequence of a deformation of the joint part. It is also known to connect the joint part and the wiper rod by positive engagement by placing them in corresponding preshaped recesses.

A disadvantage of this is that after the wiper rod is placed in the joint part, a deformation of side walls of the joint part is always required. In these connections, it is difficult to assure the secure engagement of the protrusions and to obtain the positive engagement.

SUMMARY OF THE INVENTION

Accordingly, it is an object of the present invention to provide a wiper arm which avoids the disadvantages of the prior art.

In keeping with these objects, one feature of present invention resides, briefly stated, in a wiper arm in which the retaining faces for guiding the wiper rod taper toward one another, and the wiper rod has a tapering partial region, wherein the outer dimensions of the partial region in a first portion are less than the inside distance between the retaining faces and in a second portion are wider than the side distance between the retaining faces.

Because of the tapering connection, installation without tools is possible, since the wiper rod merely has to be thrust into the joint part.

The positional fixation of the wiper rod inside the joint part can be done either by detent locking or by a tension spring. Self-locking because of a corresponding taper angle is also advantageous, particularly whenever the connection is not expected to have to be undone again later.

By means of an additional retaining region inside the joint part, the stability of the connection can be increased still further.

BRIEF DESCRIPTION OF THE DRAWING

FIG. 1 shows a view from below on the connecting point of the joint part to a wiper rod of the inventive wiper arm;

FIG. 2 is a section taken along the line II—II in FIG.

FIG. 3 is a section taken along the line III—III in FIG. 1; and

FIG. 4 is a section taken along the line IV—IV in FIG. 1.

EXEMPLARY EMBODIMENT

FIG. 1 shows the part of a wiper arm to which a joint part 1, connected to a drive mechanism that is not shown, is connected to a wiper rod 2.

On its end oriented toward the wiper rod 2, the joint part 1 has retaining faces 3, 4 of a guide region that fit over the wiper rod. The joint part 1 is also provided with detent protrusions 5, 6, which extend toward one another from the side walls of the joint part 1 and reduce the inside diameter between the side walls. The side walls of the joint part 1 in the region of the retaining faces 3, 4 taper down to the region of the protrusions 5, 6. On the other side of the protrusions 5, 6, the side walls of the joint part 1 are substantially parallel to one another.

The wiper rod 2 has a substantially rectangular cross-section and is inserted by its end into the joint part 1. To enable problem-free installation, the wiper rod 2 is also embodied as tapering in a partial region 7; the taper corresponds to that of the side walls of the joint part 1 in the region of the retaining faces 3, 4. The partial region 7 has a longitudinal length such that the width of the wiper rod 2 is reduced such that the partial region 7 can easily be placed between the retaining faces 3, 4 or the protrusions 5, 6. To that end, it suffices in the exemplary embodiment for the length of the partial region 7 to be twice the length of the partial region of the joint part 1 formed by the retaining region 3, 4 and the protrusions 5, 6. In principle, however, the taper angle and the overlap of the retaining faces 3, 4 determine the dimension of the partial region 7.

The partial region 7 ends at the transitional faces 8, so that the original cross-section with parallel sides is attained again, and a result the wiper rod is guided laterally in the joint part. This region is called the retaining region 11. This widening of cross-section is not absolutely required; what is essential is the parallel alignment of the sides.

The wiper rod 2 is also provided with a recess 9 for receiving one end of a tension spring, by which the wiper rod can be pressed into the cone of the joint part.

In the partial region 7, the wiper rod also has a constriction 10, which with the protrusions 5, 6 of the joint part 1 forms a detent connection.

FIG. 2 shows a cross-section through the end region of the wiper rod 2 installed in the joint part 1. The U-shaped profile of the joint part 1 can be seen, in which the wiper rod 2 is guided by the three sides.

FIG. 3 shows a section at the end of the partial region 7 of the wiper rod 2, so that the transitional faces 8 created because of the tapering course of the partial region 7 can be seen here.

FIG. 4 shows a section in the region of the retaining faces 3, 4. These retaining faces 3, 4 prevent the wiper rod 2 from falling out, because of the existing positive engagement.

From the above drawing figures, it can be seen that the wiper rod 2 and joint part 1 are shaped in such a way that installation without tools is possible. The wiper rod 2 has a partial region 7 that is tapered in such a way that it can be placed in the region of the retaining faces 3, 4 that is partly open at the bottom and also becomes narrower. Once the wiper rod 2 has been displaced longitudinally toward the joint part 1, the wiper rod 2, because of its tapering embodiment, is firmly seated in this guide region of the joint part 1 below the retaining faces 3, 4 and is secured in the simplest case by the tension spring subsequently suspended from the recess 9.

The location of the wiper rod 2 can additionally be fixed by the detent locking via the protrusions 5, 6 of the joint part 1 in the corresponding constriction 10 on the wiper rod. This locking is operative in addition to the connection via the tapering faces in the guide region and assures the connection between the wiper rod 2 and the joint part 1 even without a tension spring.

Thrusting the wiper rod 2 into the joint part 1 can be simultaneously with the installation of the tension spring, thus economizing on one operation in production. The optionally provided detent connection prevents the wiper rod 2 from coming loose out of the joint part 1, even if the tension spring breaks.

Because the connection between the wiper rod 2 and the joint part 1 can be undone, it is possible to repair the wiper rod 2.

If the taper angle is selected such that self-locking ensues, then no further loosening can occur, and the connection is permanent.

What is claimed is:

1. A wiper arm comprising a joint part (1) coupled with a wiper rod (2), wherein the wiper rod (2) is elongated, has a width and a thickness and is guided in the joint part (1) by a tapered guide region of said joint part, said tapered guide region defines a tapered guide channel and includes retaining faces (3,4) that define edges thereon that are spaced apart, said retaining faces are tapered towards one another such that said edges also taper towards one another, the wiper rod has an elongated tapering width region (7.1,7.2) along a portion of its length, said tapering width region defines first and second portions, the first portion (7.1) has a width along its length that is less than the spacing between said edges along said guide region and the second portion (7.2) has a width along its length that is greater than the spacing between said edges along said guide region such that the rod may be assembled with the joint part in a first assembly position and then slid to a second locking position for retention by said tapered guide region.

2. The wiper arm of claim 1, wherein the joint part (2) is provided with protrusions (5, 6), and the tapering width region (7) of the wiper rod (2) is provided with a corresponding constriction (10) for receiving the protrusions (5, 6).

3. The wiper arm of claim 1, wherein a tension spring is disposed at an end of the wiper rod and guided inside the joint part (1).

4. The wiper arm of claim 1, wherein the wiper rod (2) has a retaining region (11) with parallel sides which adjoins the tapering width region (7) and in which the wiper rod (2) enters full-surface contact with parallel sides of the joint part (1).

5. The wiper arm of claim 1, wherein a taper angle of the tapering width region and of the guide region is selected such that self-locking is effected.

* * * * *